(12) United States Patent
Kobayashi et al.

(10) Patent No.: US 11,717,917 B2
(45) Date of Patent: Aug. 8, 2023

(54) LASER PROCESSING APPARATUS AND LASER PROCESSING METHOD

(71) Applicant: Honda Motor Co., Ltd., Tokyo (JP)

(72) Inventors: Takashi Kobayashi, Tochigi (JP); Naruhiko Okubo, Tochigi (JP); Kenichi Fukami, Tochigi (JP); Seiichi Kouketsu, Tochigi (JP); Kenji Sugai, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 17/218,187

(22) Filed: Mar. 31, 2021

(65) Prior Publication Data

US 2021/0299793 A1    Sep. 30, 2021

(30) Foreign Application Priority Data

Mar. 31, 2020 (JP) ................ 2020-064222

(51) Int. Cl.
| | |
|---|---|
| *B23K 26/382* | (2014.01) |
| *B23K 26/06* | (2014.01) |
| *B23K 26/12* | (2014.01) |
| *B23K 26/08* | (2014.01) |

(52) U.S. Cl.
CPC ........ *B23K 26/382* (2015.10); *B23K 26/0661* (2013.01); *B23K 26/083* (2013.01); *B23K 26/123* (2013.01)

(58) Field of Classification Search
CPC .............. B23K 26/0661; B23K 26/083; B23K 26/123; B23K 26/382; B23K 37/0435
USPC .................................................. 219/121.71
See application file for complete search history.

(56) References Cited

U.S. PATENT DOCUMENTS

| | | | |
|---|---|---|---|
| 2016/0233100 A1* | 8/2016 | Godet ............... | H01L 29/66803 |
| 2017/0103907 A1* | 4/2017 | Chu .................. | H01L 21/68764 |

FOREIGN PATENT DOCUMENTS

JP        2002035973        2/2002

* cited by examiner

*Primary Examiner* — Dana Ross
*Assistant Examiner* — Joseph W Iskra
(74) *Attorney, Agent, or Firm* — JCIPRNET

(57) ABSTRACT

A laser processing apparatus includes: a work support portion which supports the work and forms a closed space between the work and the work support portion; pads which are movable upward and downward inside the closed space and include upper surfaces respectively coming into contact with regions obtained by dividing a processing object region having the through-holes formed in the work to surround the region of the work over one circle when the pads move upward; a drive unit which drives the pads to move forward and backward between a state in which the pad is in contact with the work and a state in which the pad is separated from the work; a gas supply unit which supplies a gas into the closed space; and clamps which contact the work supported by the work support portion on inner circumferential surfaces and outer circumferential surfaces from above over one circle.

2 Claims, 3 Drawing Sheets

LASER PROCESSING APPARATUS AND LASER PROCESSING METHOD

CROSS-REFERENCE TO RELATED APPLICATIONS

This application claims the priority benefit of Japanese Patent Application No. 2020-064222, filed on Mar. 31, 2020. The entirety of the above-mentioned patent application is hereby incorporated by reference herein and made a part of this specification.

BACKGROUND

Technical Field

The disclosure relates to a laser processing apparatus and a laser processing method.

Description of Related Art

When forming a through-hole in a workpiece by irradiating the workpiece with a laser pulse, a gas is supplied from a laser beam irradiation side to prevent fumes from appearing in a laser processing head and molten metal is discharged from a hole after penetration to prevent dross (melt) from adhering to an inner surface of the hole.

However, particularly when a plurality of through-holes are formed adjacently by laser processing, recasting may occur due to heat input by the laser beam and strain may be generated due to solidification of the molten metal. Then, there is a risk that the workpiece may crack due to the strain. A method of performing laser processing while suppressing heat input can be considered, but in this case, there is a drawback that the processing time becomes significantly longer.

Here, Japanese Patent Application Laid-Open No. 2002-35973 (Patent Document 1) discloses that a gas is also supplied from a laser beam emission side so that a gas pressure on the emission side is higher than that on an incident side to form a gas flow from the emission side to the incident side during processing and to thereby discharge generated molten metal to the incident side.

However, in the related art described in Patent Document 1 and the like, since a gas leaks from the through-hole formed in the workpiece to the incident side, there is a problem that a considerably large amount of a gas needs to be supplied to the emission side particularly when forming a plurality of through-holes.

Further, when the plurality of through-holes are formed, a problem arises in that the entire shape of the workpiece may be distorted due to the heat input to the through-hole. This problem becomes significant particularly when the workpiece has an annular shape.

SUMMARY

The disclosure has been made in view of the above-described matters and an objective thereof is to provide a laser processing apparatus and a laser processing method capable of reducing a capacity of a gas supplied to a laser beam emission side of a workpiece and suppressing strain generated in the workpiece even when a plurality of through-holes are formed.

A laser processing apparatus of the disclosure is a laser processing apparatus that forms a plurality of through-holes by irradiating a workpiece having an arch-shaped longitudinal section protruding upward and extending in an annular shape with a laser beam from above, the laser processing apparatus including: a workpiece support portion which supports a lower surface side of the workpiece and forms a closed space between the supported workpiece and the workpiece support portion; a plurality of pads which are movable upward and downward inside the closed space and include upper surfaces respectively coming into contact with a plurality of regions, obtained by dividing a processing object region having the through-holes formed in the workpiece, to surround the region of the workpiece over one circle when the pads move upward; a drive unit which drives each of the plurality of pads to move forward and backward between a state in which the pad is in contact with the workpiece and a state in which the pad is separated from the workpiece; a gas supply unit which supplies a gas into the closed space; and a clamp which comes into contact with the workpiece supported by the workpiece support portion on an inner circumferential surface or an outer circumferential surface from above over one circle.

According to the laser processing apparatus of the disclosure, the gas supply unit supplies a gas into the closed space formed between the workpiece support portion and the lower surface of the workpiece, but when the pad comes into contact with the workpiece in the region already provided with the through-hole, the leakage of the gas from the through-hole in the region can be suppressed. Accordingly, it is possible to reduce the capacity of the gas supplied into the closed space.

Further, the clamp comes into contact with the inner circumferential surface or the outer circumferential surface of the workpiece, supported by the workpiece support portion, over one circle from above. Accordingly, particularly when the through-holes are sequentially formed in the adjacent regions, it is possible to suppress strain that is generated in the workpiece due to the sequential accumulation of biases.

In the laser processing apparatus of the disclosure, a portion including the contact surface of the pad may be formed by a flexible sealing member.

In this case, since the flexible sealing member comes into contact with the lower surface of the workpiece, the through-hole already formed in the workpiece can be reliably blocked and hence the leakage of the gas from the through-hole can be further suppressed.

A laser processing method of the disclosure is a laser processing method including: supporting a lower surface side of a workpiece having an arch-shaped longitudinal section protruding upward and extending in an annular shape and forming a closed space between a lower surface of the supported workpiece and the workpiece support portion; allowing a clamp to contact the supported workpiece on an inner circumferential surface or an outer circumferential surface over one circle from above; moving a pad upward so that an upper surface comes into contact with a region provided with a through-hole among a plurality of regions obtained by dividing a processing object region having a plurality of the through-holes formed in the workpiece in a surrounding manner over one circle; supplying a gas into the closed space; and forming the through-hole in the workpiece by irradiating the workpiece with a laser beam from above.

According to the laser processing method of the disclosure, a gas is supplied into the closed space formed between the lower surface of the workpiece and the workpiece support portion supporting the lower surface side, but when the pad comes into contact with the workpiece in the region already provided with the through-hole, the leakage of the gas from the through-hole can be suppressed. Accordingly, it is possible to reduce the capacity of the gas supplied into the closed space.

Further, the clamp comes into contact with the inner circumferential surface or the outer circumferential surface of the workpiece, supported from the lower surface side, over once round from above. Accordingly, particularly when the through-holes are sequentially formed in the adjacent regions, it is possible to suppress strain that is generated in the workpiece due to the sequential accumulation of biases.

The laser processing method of the disclosure may further include: retracting the pad which comes into contact with the lower surface of the workpiece in a region adjacent to a region, forming the through-hole to extend obliquely downward toward a predetermined direction, in the predetermined direction in the plurality of regions to a non-contact position before irradiating the workpiece with the laser beam to form the through-hole in the region.

In this case, it is possible to eliminate the possibility that the pad will be damaged by the irradiation of the laser beam.

DESCRIPTION OF THE EMBODIMENTS

Figure 1:
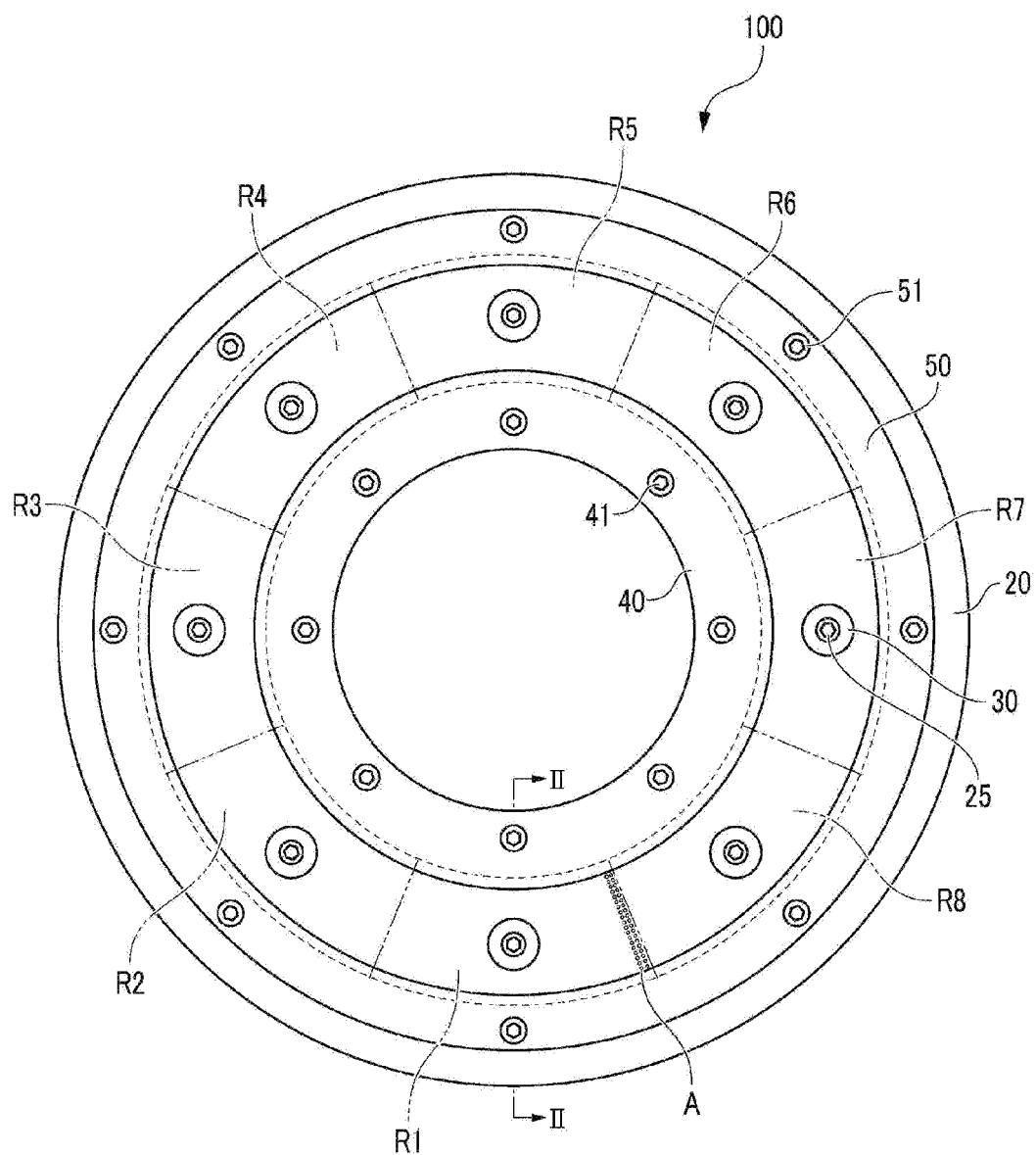
FIG. 1 is a plan view schematically showing a laser processing apparatus according to an embodiment of the disclosure.
Figure 2:
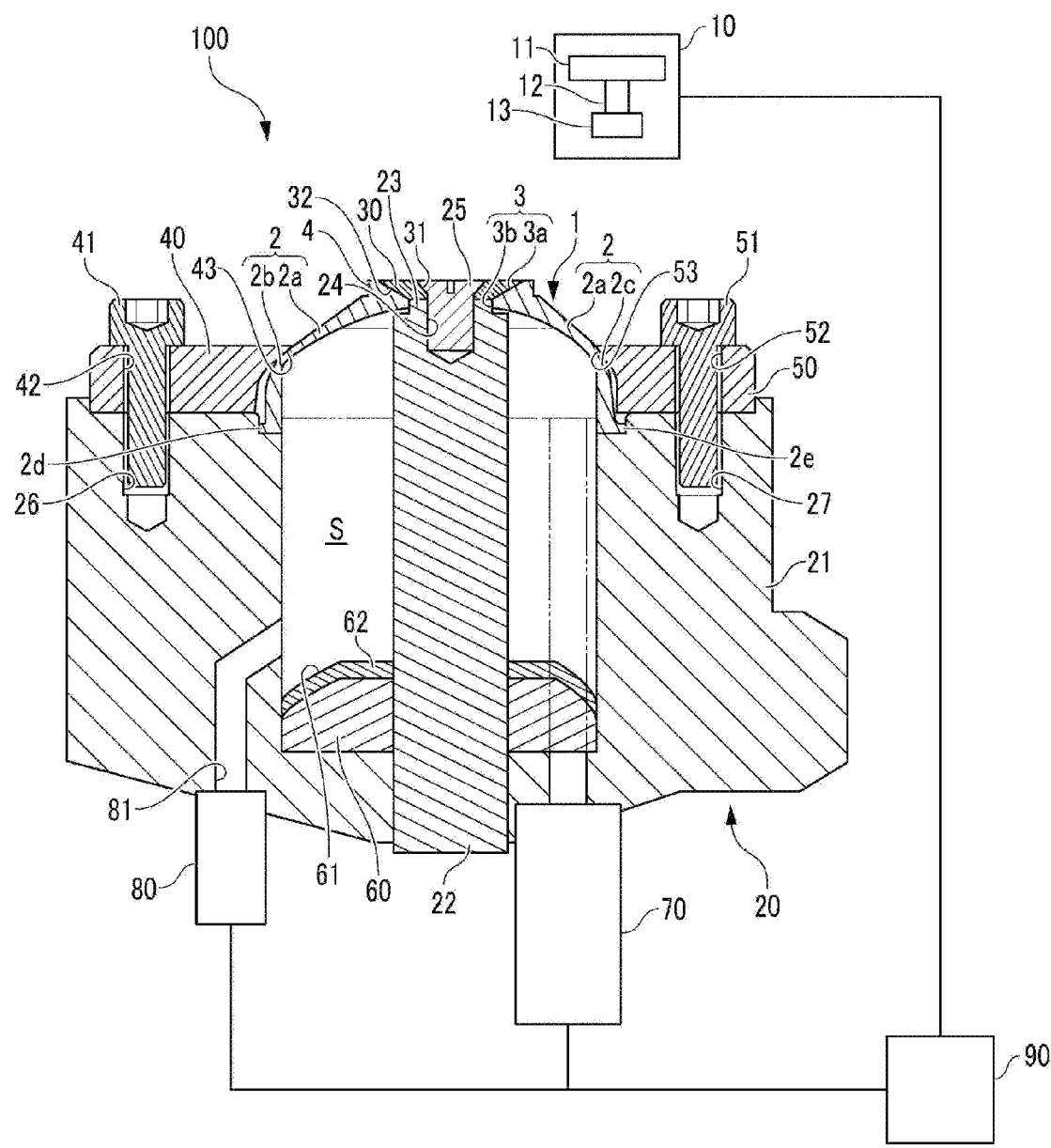
FIG. 2 is a cross-sectional view taken along a line II-II of FIG. 1.

Hereinafter, a laser processing apparatus 100 according to an embodiment of the disclosure will be described with reference to FIGS. 1 and 2. The laser processing apparatus 100 is for forming a plurality of through-holes A in a workpiece 1 having an arch-shaped longitudinal section protruding upward and extending in an annular shape by laser processing. Additionally, FIG. 1 only schematically shows a workpiece support portion 20, clamps 30, 40, and 50, and a pad 60 to be described later.

As a whole, the workpiece 1 includes a wall portion 2 which has a substantially annular shape in a plan view and has an upward protruding circular arch-shaped longitudinal section. Then, a plurality of (here, eight) port holes 3 having the same diameter are formed in the workpiece 1 at equal intervals on the same circle in a plan view to penetrate the top of the wall portion 2. However, for phasing, one particular port hole 3 may have a different diameter or diameter tolerance from the other port hole 3. The workpiece 1 is formed of, for example, an alloy having excellent heat resistance and corrosion resistance such as a nickel alloy to which molybdenum, chromium, or the like is added.

More specifically, the port hole 3 of the workpiece 1 is formed in a thick portion 4 located at a top of an upper wall portion 2a which is a substantially upper half portion of the wall portion 2. The port hole 3 includes a tapered portion 3a which has a tapered shape and opens to be inclined outward and a vertical portion 3b which is formed to be continuous to the lower portion of the tapered portion 3a and includes a vertical wall surface.

Lower wall portions 2b and 2c which are substantially lower half portions of the wall portion 2 are respectively formed to be continuous to the lower end portion of the upper wall portion 2a and are formed substantially vertically to have substantially the same thickness. Then, an inward extension portion 2d which extends horizontally inward (a direction toward the center of the workpiece 1 in a plan view) is integrally formed with the lower end portion of the inner circumferential lower wall portion 2b and an outward extension portion 2e which extends horizontally outward is integrally formed with the lower end portion of the outer circumferential lower wall portion 2c.

Then, a plurality of fine through-holes A which are inclined at the same angle in the clockwise direction from above are formed over the substantially entire surface of the upper wall portion 2a of the workpiece 1 by using the laser processing apparatus 100. Since such a through-hole A has a small hole diameter and is inclined, the through-holes have a large aspect ratio and are formed adjacently and densely. Additionally, the hole diameters and the inclined angles of the through-holes A may be the same or different from each other.

The laser processing apparatus 100 includes a laser processing head 10, the workpiece support portion 20, the clamps 30, 40, and 50, the pad 60, a drive unit 70, a gas supply unit 80, and a control unit 90.

The laser processing head 10 includes a laser source 11 which is, for example, a YAG laser, a semiconductor laser, a fiber laser, or the like capable of generating a laser pulse and a laser beam irradiation unit 13 which is connected to the laser source 11 by a transmission fiber 12 and includes an optical system such as a mirror and a lens. The laser beam which is generated by the laser source 11 according to the condition set by the control unit 90 is guided to the laser beam irradiation unit 13 by the transmission fiber 12. The laser beam irradiation unit 13 collects the laser beam transmitted by the transmission fiber 12 at a position set by the control unit 90.

The workpiece support portion 20 supports the workpiece 1 from the lower surface (back surface) side. The lower surface side is a laser emission side. Since the workpiece support portion 20 supports the workpiece 1 to be processed to have the through-holes A, a closed space S is formed between the lower surface of the workpiece 1 and the workpiece support portion 20. Here, the workpiece support portion 20 supports the workpiece 1 by placing the workpiece on three positions such as a circumferential edge portion of a portion provided with the port hole 3 of the workpiece 1, a lower surface which is continuous to the inward extension portion 2d and the lower end portion of the inner circumferential lower wall portion 2b, and a lower surface which is continuous to the outward extension portion 2e and the lower end portion of the outer circumferential lower wall portion 2c.

Specifically, the workpiece support portion 20 includes a columnar pin 22 which is fixed to a support body 21 constituting a main body of the workpiece support portion 20 and a short columnar protrusion portion 23 which has a diameter smaller than that of the pin 22 is integrally formed with the top of the pin 22. Then, the protrusion portion 23 is located inside the port hole 3 of the workpiece 1 in the vicinity of the inside of the vertical portion 3b of the port hole 3. In this state, the lower surface of the lower portion of the vertical portion 3b of the workpiece 1 (the lower surface on the inner side of the thick portion 4) is supported while being placed on the upper surface of the pin 22 present in the outer circumference of the protrusion portion 23 of the pin 22.

Additionally, an outer circumferential surface of the pin 22, particularly a portion including an outer circumferential surface of a portion including an upper end portion thereof, is preferably formed of a material such as Teflon that transmits the laser and attenuates the output of the laser. Further, the upper end portion of the pin 22 is preferably formed in a tapered shape corresponding to the shape of the lower surface of the thick portion 4 coming into contact with the pin.

Furthermore, a bolt hole 24 is formed in the top of the protrusion portion 23 and the port clamp 30 is fixed to the upper surface of the protrusion portion 23 by a bolt 25 threaded into the bolt hole 24. The port clamp 30 includes a tapered hole 31 which penetrates in a tapered shape so that a head of the bolt 25 is fitted thereinto. Then, the port clamp 30 has an annular shape in a plan view and the outer peripheral surface thereof is a tapered surface 32 which is inclined at the same angle as the taper of the tapered portion 3a of the workpiece 1.

In such a configuration, since each port clamp 30 is fixed to each top of the protrusion portion 23 by the bolt 25, the tapered portion 3a of the workpiece 1 comes into contact with the tapered surface 32 of the port clamp 30 so that the workpiece 1 is fixed to a predetermined position of the workpiece support portion 20.

Furthermore, the upper surface of the support body 21 of the workpiece support portion 20 is provided with a plurality of bolt holes 26 which are located inside the supported workpiece 1 and fix the inner clamp 40 by the bolt 41. The inner clamp 40 has a substantially annular shape in a plan view as a whole and through-holes 42 are formed at equal intervals on the same circle in a plan view to correspond to the bolt holes 26. The inner clamp 40 includes a notched portion 43 on the side of the workpiece 1, that is, the outside, the notched portion 43 is inclined inward at a predetermined angle to contact in a point shape in a longitudinal sectional view in the vicinity of the lower end portion of the upper wall portion 2a of the workpiece 1 at the upper end portion thereof, and the inner circumferential lower wall portion 2b of the workpiece 1 does not hit the inner clamp.

Further, the upper surface of the support body 21 of the workpiece support portion 20 is provided with a plurality of bolt holes 27 which are located outside the supported workpiece 1 and fix the outer clamp 50 by a bolt 51. The outer clamp 50 has a substantially annular shape in a plan view as a whole and through-holes 52 are formed at equal intervals on the same circle in a plan view to correspond to the bolt holes 27. The outer clamp 50 includes a notched portion 53 on the side of the workpiece 1, that is, the inside, the notched portion 53 is inclined outward at a predetermined angle to contact in a point shape in a longitudinal sectional view in the vicinity of the lower end portion of the upper wall portion 2a of the workpiece 1 at the upper end portion thereof, and the inner circumferential lower wall portion 2b of the workpiece 1 does not hit the outer clamp.

The upper surface of the pad 60 is provided with a contact surface 61 which is located inside the closed space S and is in contact with the lower surface of the workpiece 1. Then, the plurality of pads 60 are provided to respectively correspond to a plurality of regions R1 to R8 obtained by dividing a processing object region in which the fine through-holes A are formed in the workpiece 1. Here, the processing object region of the workpiece 1 is a substantially entire surface of the upper wall portion 2a of the workpiece 1 and this region is divided into a plurality of regions in the circumferential direction. Here, the region is divided into eight regions R1 to R8 about the port hole 3.

Then, each pad 60 is movable upward and downward along the pin 22 and the through-hole formed at the center portion is slidable along the outer circumferential surface of the pin 22.

Each pad 60 includes an upper surface (surface) as the contact surface 61 so as to follow the lower surface of the upper wall portion 2a of the workpiece 1. When the contact surface 61 of the pad 60 is pressed against the lower surface of a predetermined region Rn (n is any one of 1 to 8) of the upper wall portion 2a of the workpiece 1, the contact surface comes into contact with the region Rn in a surrounding manner over one circle. Accordingly, the airtightness of the closed space S is maintained even when the through-hole A is formed in the upper wall portion 2a.

Additionally, the contact surface 61 of the pad 60 may be formed to follow the entire lower surface of the upper wall portion 2a of the workpiece 1 in the region Rn, but may be formed to follow, for example, only the lower surface of the upper wall portion 2a on the lower side in relation to the vicinity of the port hole 3. Also in this case, when the pad 60 comes into contact with the lower portion of the upper wall portion 2a, the airtightness of the closed space S is maintained. Further, the contact surface may linearly contact the region Rn in a surrounding manner.

Furthermore, it is preferable that a portion including the contact surface 61 of the pad 60 be formed by a sealing member 62 formed of a flexible material such as silicon gel. Accordingly, when the pad 60 is pressed against the workpiece 1, the through-hole A can be reliably blocked by the sealing member 62. Further, it is preferable to cover the side surface of the pad 60 by a protection plate such as a copper plate. Accordingly, it is possible to reduce the damage of the pad 60 due to the irradiation of the laser beam.

The drive unit 70 is provided independently from each pad 60. The drive unit 70 is configured so that the pad 60 is independently movable forward and backward (movable upward and downward) and is configured as, for example, a fluid pressure cylinder such as a hydraulic cylinder. Then, the pad 60 is fixed to a tip of a piston of the fluid pressure cylinder. Additionally, the drive unit 70 may have another configuration using an electric motor, a gear mechanism, or the like.

Furthermore, the drive unit 70 may include, for example, a bar member fixed to the pad 60 and a fixing tool fixing the bar member at a pushed position. In this case, the operator may move the pad 60 upward and downward by gripping the bar member and fix the bar member using the fixing tool so as to maintain a state in which the pad 60 is in contact with the lower surface of the workpiece 1.

The drive unit 70 is configured to have a forward and backward stroke capable of retracting the pad 60 to a position sufficiently separated from the workpiece 1 so that the pad 60 is not damaged by a laser beam emitted from the laser processing head 10 when the pad 60 is located at the retraction position.

The gas supply unit 80 supplies a gas such as air, argon, and nitrogen into the closed space S via a gas supply path 81 formed in the support body 21 so that a gas pressure of the closed space S is larger than a gas pressure on the outside, particularly a space located on the surface side of the workpiece 1. Specifically, the gas supply unit 80 supplies a gas into the closed space S so as to generate a gas pressure difference of 0.1 MPa or more and more preferably 0.5 MPa or more with respect to the external gas pressure. The gas supply unit 80 supplies a gas into the closed space S between the pad 60 at a contact position coming into contact with the workpiece 1 and the pad 60 at a retraction position farthest from the workpiece 1.

Although not shown in the drawings, a gas supply unit supplying a gas to the surface side of the workpiece 1 may be provided. Accordingly, it is possible to suppress heat from being input to the workpiece 1 and to discharge molten metal from the upper surface side by allowing a gas flow to flow inside the through-hole A in the middle of forming the through-hole.

The control unit 90 is connected to the laser processing head 10, the drive unit 70, and the gas supply unit 80 and controls each operation. Additionally, the control unit 90 may be separately provided to control each of the laser processing head 10, the drive unit 70, and the gas supply unit 80 or may be integrally provided to control all of them.

Figure 3:
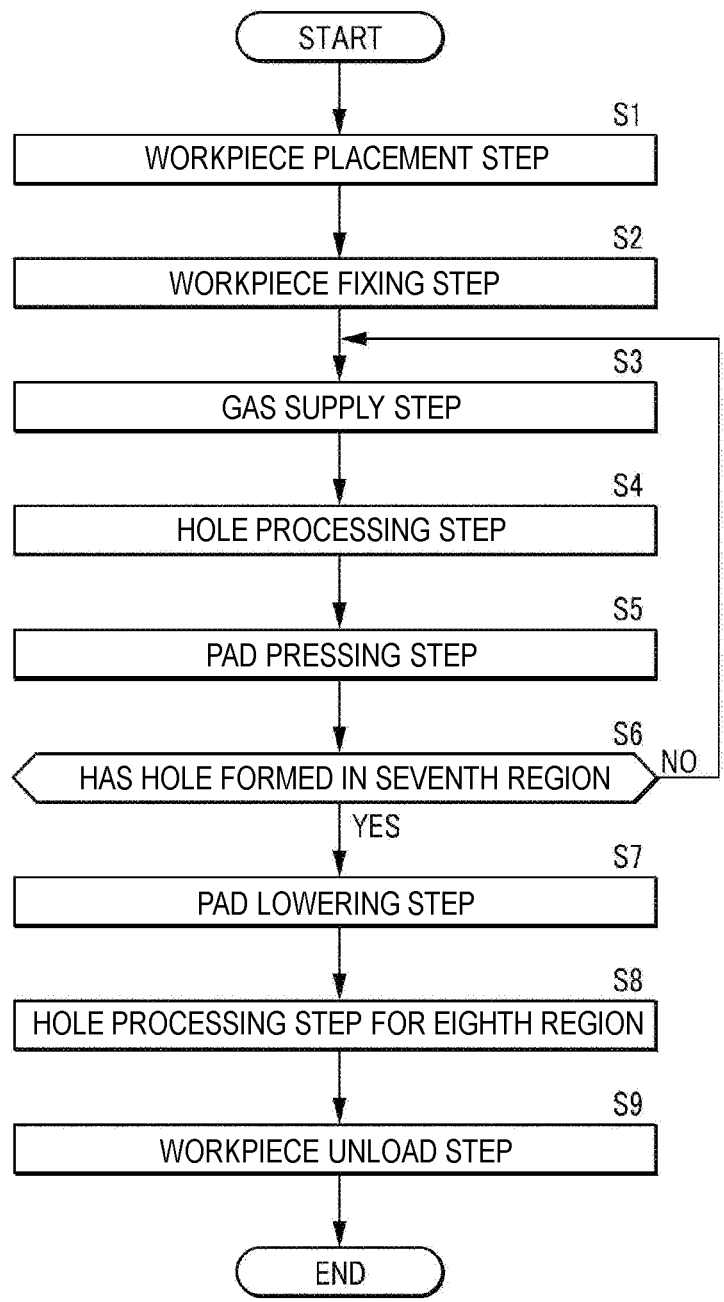
FIG. 3 is a flowchart showing a laser processing method according to an embodiment of the disclosure.

Hereinafter, a laser processing method according to the embodiment of the disclosure using the laser processing apparatus 100 will be described with reference to FIG. 3.

First, a workpiece placement step (S1) in which the workpiece 1 is placed on a predetermined position of the workpiece support portion 20 is performed. At this time, the clamps 30, 40, and 50 are removed from the workpiece support portion 20 in advance and all pads 60 are located at the retraction position. Then, the operator places the workpiece 1 on a predetermined position of the workpiece support portion 20 so that each port hole 3 of the workpiece 1 is located inside the protrusion portion 23.

Then, a workpiece fixing step (S2) in which the workpiece 1 placed on a predetermined position of the workpiece support portion 20 is fixed by the clamps 30, 40, and 50 is performed. Specifically, the operator fixes the workpiece 1 to the workpiece support portion 20 by each port clamp 30. Further, the workpiece 1 is fixed to the workpiece support portion 20 also by the inner clamp 40 and the outer clamp 50.

Next, a gas supply step (S3) in which the gas supply unit 80 supplies a gas into the closed space S so that a predetermined gas pressure is formed inside the closed space S is performed.

After the gas pressure inside the closed space S becomes a predetermined pressure or more, a hole processing step (S4) in which the laser processing head 10 forms a predetermined number of fine through-holes A in the first region R1 of the workpiece 1 is performed. Each through-hole A is formed one by one. At this time, since a gas flow is discharged from the closed space S to the upper surface side of the workpiece 1 through the through-hole A when the through-hole A is formed, it is possible to suppress heat input in the vicinity of the through-hole A and to discharge the dross present inside the through-hole A.

Additionally, when the through-hole A is formed, a gas is discharged to the outside therefrom. Accordingly, it is preferable to continuously or intermittently supply a gas by the gas supply unit 80 in the hole processing step (S4).

Next, a pad pressing step (S5) in which the pad 60 corresponding to the first region R1 is lifted by the drive unit 70 to be pressed against the lower surface of the workpiece 1 so that the pad 60 is pressed against the lower side of the first region R1 of the workpiece 1 provided with the fine through-holes A is performed.

Next, a hole processing step (S4) in which the laser processing head 10 forms a predetermined number of fine through-holes A in the second region R2 adjacent to the first region R1 of the workpiece 1 is performed. Then, after all fine through-holes A are formed in the second region R2, a pad pressing step (S5) in which the pad 60 is pressed against the lower surface of the second region R2 of the workpiece 1 is performed.

Then, the hole processing step (S4) and the pad pressing step (S5) are sequentially performed on the third to seventh regions R3 to R7.

After the through-hole A is completely formed in the seventh region of the workpiece 1 (S6: YES), a pad lowering step (S7) in which the drive unit 70 is controlled so that the pad 60 corresponding to the first region R1 is retracted is performed. This is because the risk that the pad 60 may be damaged due to the irradiation of the laser in the pad 60 corresponding to the first region R1 is avoided when forming the fine through-holes A in the eighth region R8, particularly a region close to the first region R1. Then, a hole processing step (S8) in which only a predetermined number of fine through-holes A are formed in the eighth region R8 of the workpiece 1 is performed.

When the fine through-holes A are formed in all regions, that is, the first to eighth regions R1 to R8 as described above, the operator performs a workpiece unload step (S9) in which the workpiece 1 is unloaded by releasing the clamps 30, 40, and 50. Accordingly, all steps end.

As described above, according to this embodiment, the gas supply unit 80 supplies a gas into the closed space S formed between the workpiece support portion 20 and the lower surface of the workpiece 1, but since the pad 60 comes into contact with the lower surface of the workpiece 1 in the region Rn already provided with the through-hole A, the leakage of the gas from the through-hole A present in the region Rn can be suppressed. Accordingly, it is possible to reduce the capacity of the gas supplied into the closed space S.

Further, the workpiece 1 supported by the workpiece support portion 20 is restrained by the inner clamp 40 coming into contact with the workpiece 1 on the inner circumferential surface over one circle and the outer clamp 50 coming into contact with the workpiece 1 on the outer circumferential surface over one circle from above. Accordingly, it is possible to suppress the strain generated in the workpiece 1 and thus it is not necessary to provide a step of correcting the strain of the workpiece 1 after the processing is completed. Particularly, since the through-holes A are sequentially formed from the region R1 to the region R8, it is possible to suppress the strain caused by the sequential accumulation of biases.

Although the embodiment of the disclosure has been described above, the disclosure is not limited thereto and the configuration or form of the workpiece 1 and the laser processing apparatus 100 can be changed appropriately. Further, for example, a case in which the through-hole A is formed to be inclined has been described, but the through-hole A may be formed perpendicularly.

Further, a case in which the regions R1 to R8 for forming the through-hole A are divided in the circumferential direction has been described, but the mode of dividing the region is not limited thereto. For example, the regions may be divided in other directions such as a radial direction. Further, a case in which the through-holes A are sequentially formed in the regions R1 to R8 in the order of adjacent regions has been described, but a procedure of forming the through-holes A is not limited thereto.

Furthermore, a case in which the pad 60 is provided to correspond to each region Rn has been described, but a relationship between the pad 60 and the region Rn is not limited thereto. For example, the pad 60 corresponding to the first region R1 may be provided to be divided into a plurality of pads and only the pad which may be irradiated with a laser beam among the plurality of pads when forming the through-hole A in the eighth region R8 may be retracted.

Further, a case in which both the inner clamp 40 coming into contact with the inner circumferential side of the workpiece 1 over one circle from above and the outer clamp 50 coming into contact with the outer circumferential side of the workpiece 1 over one circle are used has been described, but only one of these clamps 40 and 50 may be used. Further, one of these clamps 40 and 50 may contact the workpiece 1 intermittently instead of over one circle.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A laser processing apparatus that Rains a plurality of through-holes by irradiating a workpiece having an arch-shaped longitudinal section protruding upward and extending in an annular shape with a laser beam from above, the laser processing apparatus comprising:
    a workpiece support portion which supports a lower surface side of the workpiece and forms a closed space between the supported workpiece and the workpiece support portion;
    a plurality of pads which are movable upward and downward inside the closed space and comprise upper surfaces respectively coming into contact with a plurality of regions, obtained by dividing a processing object region having the through-holes formed in the workpiece, to surround the region of the workpiece over one circle when the pads move upward;
    a drive unit which drives each of the plurality of pads to move forward and backward between a state in which the pad is in contact with the workpiece and a state in which the pad is separated from the workpiece;
    a gas supply unit which supplies a gas into the closed space; and
    a clamp which comes into contact with the workpiece supported by the workpiece support portion on an inner circumferential surface or an outer circumferential surface from above over one circle,
    wherein a portion comprising the contact surface of the pad is formed of a flexible sealing member.

2. A laser processing method comprising:
    supporting a lower surface side of a workpiece having an arch-shaped longitudinal section protruding upward and extending in an annular shape and Bantling a closed space between a lower surface of the supported workpiece and the workpiece support portion;
    allowing a clamp to contact the supported workpiece on an inner circumferential surface or an outer circumferential surface over one circle from above;
    moving a pad upward so that an upper surface comes into contact with a region provided with a through-hole among a plurality of regions obtained by dividing a processing object region having a plurality of the through-holes formed in the workpiece in a surrounding manner over one circle;
    supplying a gas into the closed space;
    forming the through-hole in the workpiece by irradiating the workpiece with a laser beam from above; and
    retracting the pad of which the upper surface comes into contact with the workpiece in a region adjacent to another region, forming the through-hole to extend obliquely downward toward a predetermined direction, in the predetermined direction in the plurality of regions to a non-contact position before irradiating the workpiece with the laser beam to form the through-hole in the region.

* * * * *